United States Patent
Bogan

[19]

[11] Patent Number: 6,092,706
[45] Date of Patent: Jul. 25, 2000

[54] B.C. BICYCLE RACK

[76] Inventor: Joel B. Bogan, 5457 Elk Creek Rd., Middletown, Ohio 45042

[21] Appl. No.: 09/353,832

[22] Filed: Jul. 15, 1999

[51] Int. Cl.[7] .................................................. B60R 9/10
[52] U.S. Cl. ........................ 224/401; 224/492; 224/514; 224/537; 224/534
[58] Field of Search ..................... 224/924, 401, 224/492, 493, 512, 513, 514, 515, 537, 534

[56] References Cited

U.S. PATENT DOCUMENTS

| | | | |
|---|---|---|---|
| 4,921,152 | 5/1990 | Kemming | 224/924 |
| 5,269,446 | 12/1993 | Biehn | 224/924 |
| 5,495,970 | 3/1996 | Pedrini . | |
| 5,628,440 | 5/1997 | Gallazzini . | |
| 5,690,259 | 11/1997 | Montani . | |
| 5,752,640 | 5/1998 | Proulx . | |

FOREIGN PATENT DOCUMENTS 3526243  2/1987  Germany .............................. 224/924

*Primary Examiner*—Linda J. Sholl
*Attorney, Agent, or Firm*—Patent & Trademark Services; Joseph H. McGlynn

[57] ABSTRACT

A bicycle carrier which can be used with a camper that is pulled by a towing vehicle. The carrier has a first part which is secured to the top of the camper and which accepts the front wheels of the bikes, and a second part which is secured to the rear bumper of the carrier to secure the rear wheels of the bikes.

10 Claims, 3 Drawing Sheets

6,092,706

B.C. BICYCLE RACK

BACKGROUND OF THE INVENTION

This invention relates, in general, to bicycle racks, and, in particular, to bicycle racks which can be attached to a camper.

1. Description of the Prior Art

In the prior art various types of have been proposed. For example, U.S. Pat. No. 5,495,970 to Pedrini discloses a rack which can be attached to the rear of a vehicle and which has a support attached to the rear window of the vehicle and securing means attached to the top and bottom of the vehicle to stabilize the rack.

U.S. Pat. No. 5,628,440 to Gallazzini discloses a bicycle carrier which utilizes two looped straps which are anchored by a capped tube.

U.S. Pat. No. 5,690,259 to Montani discloses a bike carrier which has transverse load rods attached to the roof of a vehicle and a base to protect the rear window.

U.S. Pat. No. 5,752,640 to Proulx discloses a collapsible carrier which has three flexible straps which secure the bike to the front or rear bumper of the vehicle.

SUMMARY OF THE INVENTION

The present invention is directed to a bicycle carrier which can be used with a camper that is pulled by a towing vehicle. The carrier has a first part which is secured to the top of the camper and which accepts the front wheels of the bikes, and a second part which is secured to the rear bumper of the carrier to secure the rear wheels of the bikes.

It is an object of the present invention to provide a new and improved carrier for bicycles.

It is an object of the present invention to provide a new and improved carrier for bicycles which can be utilized with a camper.

It is an object of the present invention to provide a new and improved carrier for bicycles which can easily and securely attach a plurality of bicycles to a camper towed by a vehicle.

These and other objects and advantages of the present invention will be fully apparent from the following description, when taken in connection with the annexed drawings.

DESCRIPTION OF THE PREFERRED EMBODIMENT

Figure 1:
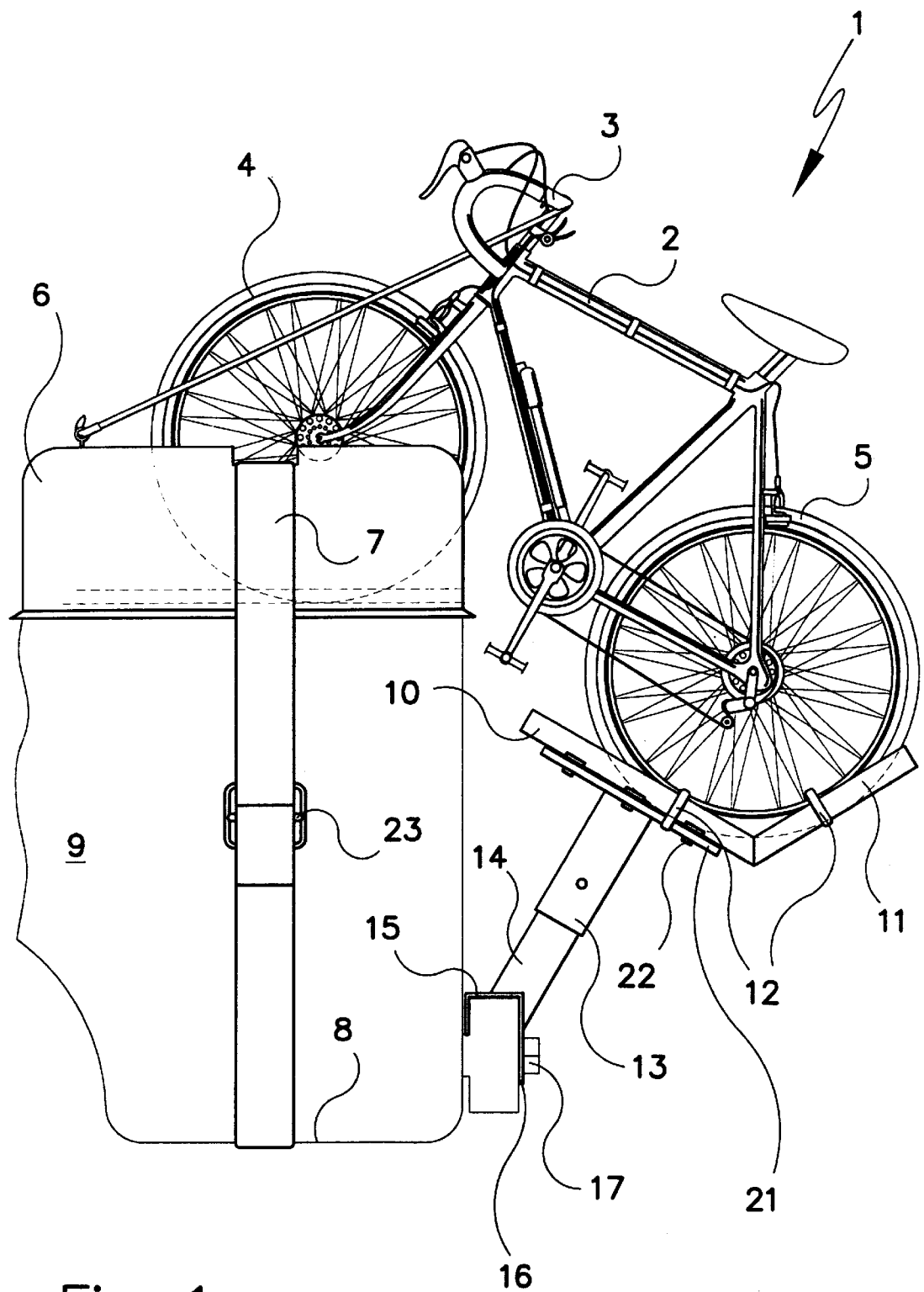
FIG. 1 is a side view of the present invention attached to a camper.

Referring now to the drawings in greater detail, FIG. 1 shows a bicycle 2 with handlebars 3 and front wheel 4 and rear wheel 5 secured to the carrier 1 of the present invention. The carrier 1 is secured to the rear of a conventional camper 9 that will be towed by a vehicle (not shown).

The carrier of the present invention is comprised of two parts. The first part 6 is attached to the top of the camper 6 by any conventional means such as bolts (not shown). The second part of the carrier 24 (shown in FIG. 3) is bolted to the bumper 16 of the camper 9 by bolts 17.

Figure 2:
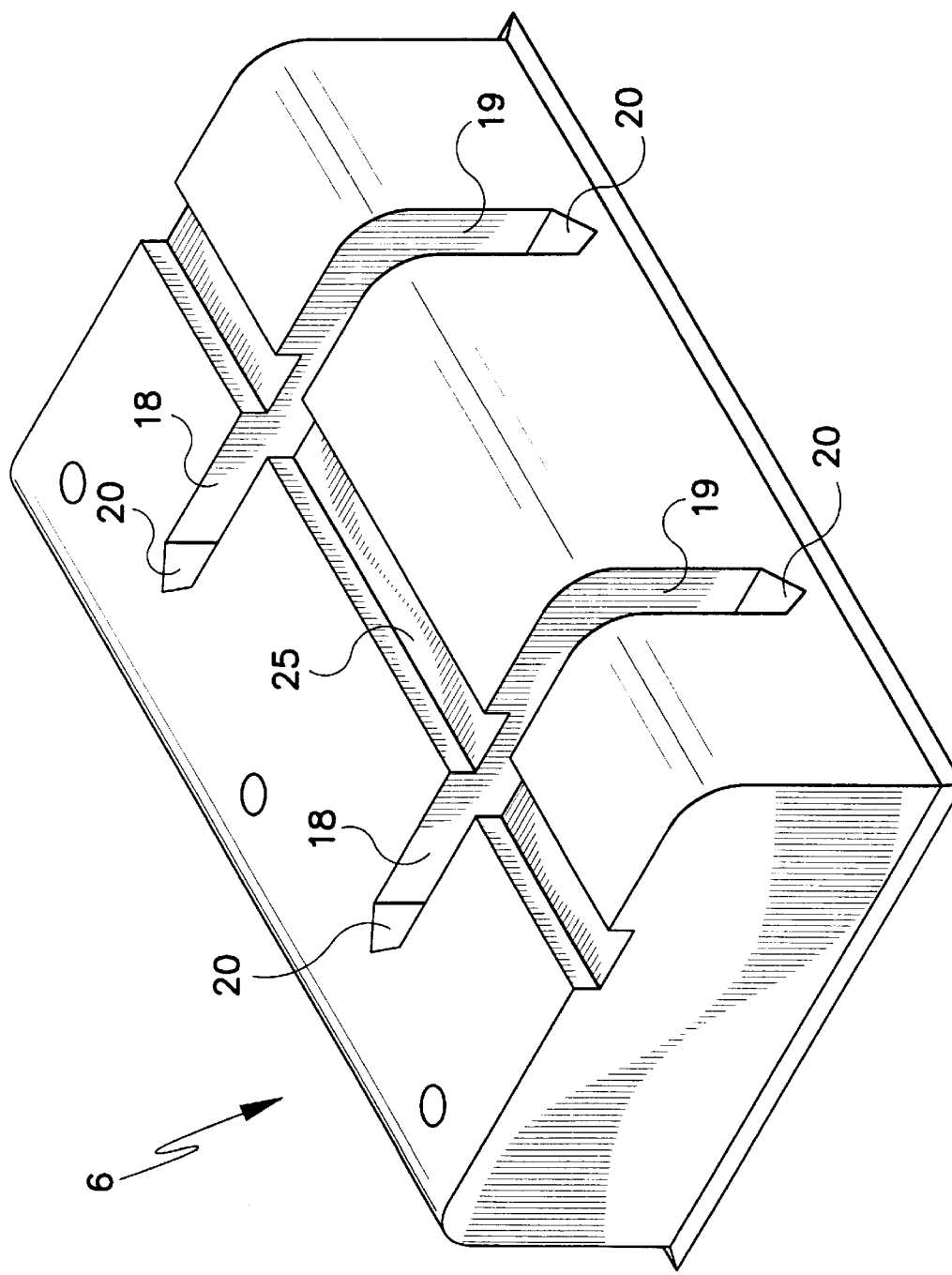
FIG. 2 is a perspective view of one part of the of the present invention.

The first part 6 of the carrier 1 is shown in FIG. 2, and comprises a box which can be made from fiberglass or plastic by any conventional method such as molding. The box will have at least two slots formed therein consisting of a horizontal slot portion 18 and a vertical slot portion 19, which will receive the front wheel of the bicycle 2, as shown in FIG. 1. The bottom portion of the slot 19 will have a V-shape 20 to center and stabilize the wheel of the bicycle. Also, the back of the slot 18 will have a V-shape 20 to center and stabilize the wheel of the bicycle.

Figure 3:
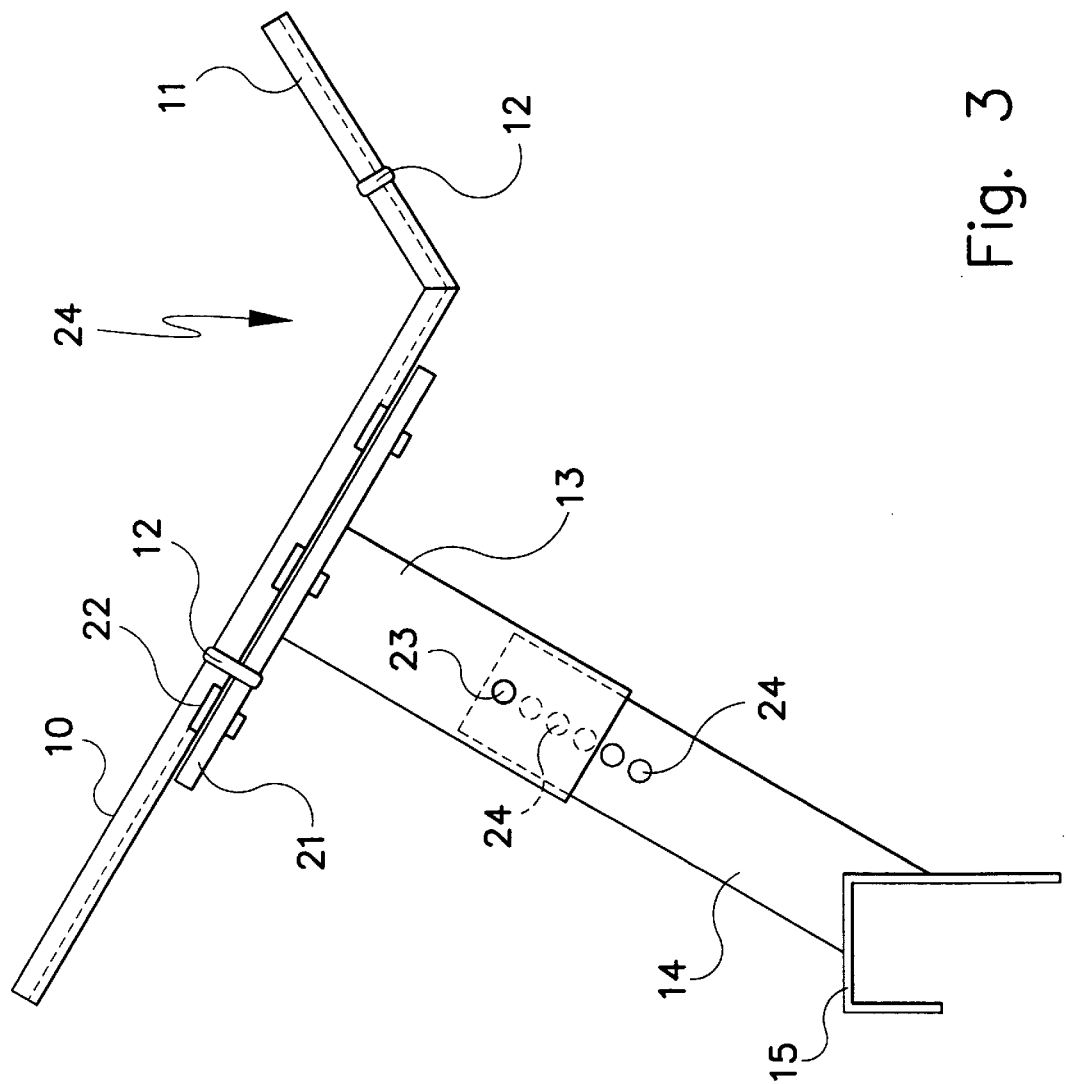
FIG. 3 is a side view of another part of the present invention.

The second part 24 of the carrier is shown in FIG. 3 and will be attached to the bumper of the camper. It comprises two arms 10, 11 made from steel "C" channel, although other materials can be used, which are secured together at an angle by any conventional means, such as welding. A plate 21 is attached to a tube 13 and bolted to the arm 10 by conventional bolts 22. Part 10 has evenly spaced holes to make it adjustable. The arm 13 telescopically receives a second arm 14, and each of the arms have a series of apertures 24 which can be aligned and a pin 23 can be passed through the aligned apertures to hold the arms in a fixed position with respect to each other. This will allow the second part 24 to be adjusted to fit different size bicycles.

Attached to the bottom arm 14 is an L-shaped bracket 15 which will hook over the rear bumper 16 of the camper and will be bolted thereto by bolts 17. This will provide a firm base to securely hold the rear wheel 5 of the bicycle to the camper.

In order to use the present invention, the first part 6 would be attached to the top of the camper 9, and then the second part 24 would be attached to the bumper 16. Then the arms 13, 14 would be adjusted to fit the bicycles that would be carried. Next, the rear tire 5 would be placed into the steel "C" channels 10, 11 and the front wheel would be placed into the slot 18, 19 of the first part 6. At this point the bicycle would be held in the carrier without the need for a second person. Next a strap 7 with conventional length adjusting means 23 would be hooked to any convenient portion of the camper by hooks 8, and then the strap would be passed through horizontal groove 25, through the front wheel 4 and over the opposite side of the camper where it will be secured with another hook 8.

The rear wheel 5 of the bicycle will then be secured to the arms 10, 11 with straps 12. This will securely hold the bicycle to the rear of the camper during transportation.

It should be noted that the drawings show the carrier as being adapted to hold two bicycles, however, it could be adapted to hold one bicycle or more than two bicycles without departing from the scope of the invention.

Although the B.C. Bicycle Rack and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A bicycle rack adapted to secure at least one bicycle to a camper, said bicycle rack comprising:

a first part adapted to be secure to a top portion of the camper, and a second part adapted to be secured to a bumper on the camper, said first part comprising a top portion, a front portion, a rear portion and a bottom portion, at least one slot extending through said front portion and said top portion and adapted to receive a wheel on said bicycle, said second part comprising means for attaching said second part to said bumper, and a tube attached to said means for attaching said second part to said bumper, and means for receiving a second wheel on said bicycle attached to said tube.

2. The bicycle rack as claimed in claim 1, wherein said first part has a second slot extending substantially perpendicular to said at least one slot.

3. The bicycle rack as claimed in claim 1, wherein said at least one slot has a V-shaped bottom.

4. The bicycle rack as claimed in claim 1, wherein said means for attaching said second part to said bumper is an L-shaped bracket.

5. The bicycle rack as claimed in claim 1, wherein said tube is composed of two parts, each of said two parts having a series of apertures therein, and a pin adapted to be passed through one of said series of apertures in one of said two parts and through one of said series of apertures in another of said two parts to adjustably hold said two parts together.

6. The bicycle rack as claimed in claim 1, wherein said means for receiving a second wheel comprises a pair of arms, each of said arms having means for receiving said second wheel.

7. The bicycle rack as claimed in claim 6, wherein said arms extend at substantially a right angle to each other.

8. The bicycle rack as claimed in claim 6, wherein said arms have a strap means for fastening said second wheel to said arms.

9. The bicycle rack as claimed in claim 1, wherein said first part has a strap means for fastening said wheel on said bicycle to said at least one slot.

10. The bicycle rack as claimed in claim 1, wherein there are two slots extending through said front portion and said top portion of said first part, and each of said slots are adapted to receive a wheel on a bicycle.

* * * * *